(12) United States Patent
Nakamura (10) Patent No.: US 10,725,277 B2
(45) Date of Patent: Jul. 28, 2020

(54) OBJECTIVE LENS UNIT AND LIQUID IMMERSION MICROSCOPE

(71) Applicant: Yokogawa Electric Corporation, Tokyo (JP)

(72) Inventor: Tsuyoshi Nakamura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 533 days.

(21) Appl. No.: 15/493,800

(22) Filed: Apr. 21, 2017

(65) Prior Publication Data

US 2017/0336615 A1    Nov. 23, 2017

(30) Foreign Application Priority Data

May 18, 2016 (JP) ................................. 2016-099336

(51) Int. Cl.
*G02B 21/33* (2006.01)
*G02B 21/02* (2006.01)
*G02B 21/00* (2006.01)
*G02B 7/02* (2006.01)

(52) U.S. Cl.
CPC ......... *G02B 21/33* (2013.01); *G02B 21/0088* (2013.01); *G02B 21/02* (2013.01); *G02B 7/028* (2013.01)

(58) Field of Classification Search
CPC ... G03F 7/70341; G03F 7/2041; G02B 21/33; G02B 21/02; G02B 21/0088; G02B 27/0006; G02B 7/028; G02B 21/00
See application file for complete search history.

(56) References Cited

U.S. PATENT DOCUMENTS

| 4,376,570 | A | 3/1983 | Sussman | |
|---|---|---|---|---|
| 7,304,793 | B2 | 12/2007 | Hummel | |
| 2004/0263961 | A1 | 12/2004 | Hummel | |
| 2005/0030497 | A1* | 2/2005 | Nakamura | G03F 7/70341 355/30 |
| 2005/0134817 | A1* | 6/2005 | Nakamura | G03F 7/70341 355/53 |
| 2005/0140948 | A1* | 6/2005 | Tokita | G03F 7/70341 355/30 |
| 2005/0213066 | A1* | 9/2005 | Sumiyoshi | G03F 7/70233 355/53 |

(Continued)

FOREIGN PATENT DOCUMENTS

| EP | 1571697 A1 | 9/2005 |
|---|---|---|
| EP | 1 783 821 A1 | 5/2007 |

(Continued)

*Primary Examiner* — William R Alexander
*Assistant Examiner* — Balram T Parbadia
(74) *Attorney, Agent, or Firm* — Sughrue Mion, PLLC (57) ABSTRACT

An objective lens unit for a liquid immersion microscope includes: a first liquid passage in a pipe shape including an opening disposed at a lens surface end as a lens surface of a lens at a closest side to an observing object, the first liquid passage being coupled to an outside of the objective lens unit, and a second liquid passage in a pipe shape disposed independently from the first liquid passage, the second liquid passage including an opening disposed at a position adjacent to the opening of the first liquid passage on the lens surface end, the second liquid passage being coupled to the outside of the objective lens unit.

9 Claims, 11 Drawing Sheets

(56) References Cited

U.S. PATENT DOCUMENTS

| | | | |
|---|---|---|---|
| 2005/0225737 A1* | 10/2005 | Weissenrieder | G03F 7/70341 355/53 |
| 2005/0275817 A1* | 12/2005 | Nakata | G03F 7/2041 355/53 |
| 2006/0012765 A1 | 1/2006 | Kameyama | |
| 2006/0087745 A1 | 4/2006 | Fahlbusch et al. | |
| 2007/0070315 A1* | 3/2007 | Jacobs | G03F 7/70341 355/53 |
| 2007/0081140 A1 | 4/2007 | Beckers et al. | |
| 2007/0109514 A1* | 5/2007 | Nyui | G03F 7/70341 355/53 |
| 2007/0291239 A1 | 12/2007 | Shiraishi | |
| 2008/0259446 A1 | 10/2008 | Komatsu et al. | |
| 2010/0027109 A1 | 2/2010 | Liebel et al. | |
| 2013/0003187 A1 | 1/2013 | Wartmann | |
| 2015/0212310 A1 | 7/2015 | Fukuda et al. | |

FOREIGN PATENT DOCUMENTS

| | | |
|---|---|---|
| EP | 1855140 A1 | 11/2007 |
| JP | 2007-316233 A | 12/2007 |
| JP | 4443832 B2 | 3/2010 |
| JP | 2011-44736 A | 3/2011 |
| JP | 2012-186509 A | 9/2012 |
| JP | 2015-141396 A | 8/2015 |
| WO | 02/093232 A2 | 11/2002 |

\* cited by examiner

OBJECTIVE LENS UNIT AND LIQUID IMMERSION MICROSCOPE

CROSS-REFERENCE TO RELATED APPLICATION

This application claims priority from Japanese Patent Application No. 2016-099336 filed with the Japan Patent Office on May 18, 2016, the entire content of which is hereby incorporated by reference.

BACKGROUND

1. Technical Field

The embodiment of the present disclosure relates to an objective lens unit including an objective lens for a liquid immersion microscope and a liquid immersion microscope including such objective lens unit.

2. Description of the Related Art

There has been known a liquid immersion microscope that immerses a lens surface at the closest side to an observing object in an immersion liquid high in refractive index, such as a water or an oil, in order to enhance a resolution by increasing a numerical aperture of an objective lens (e.g., Japanese Patent No. 4443832).

Figure 11:
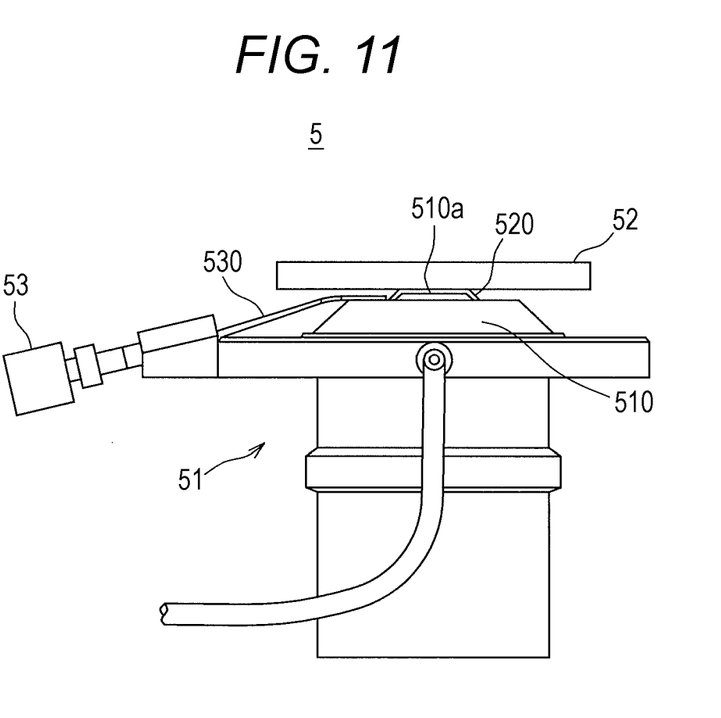
FIG. 11 is a schematic diagram illustrating a known example of the liquid immersion microscope.

FIG. 11 is a schematic diagram illustrating a known example of the liquid immersion microscope. This FIG. 11 illustrates what is called an inverted liquid immersion microscope 5 mainly focused on an objective lens unit 51.

In the liquid immersion microscope 5 illustrated in FIG. 11, the objective lens unit 51 is disposed below a tray 52 that houses a specimen of the observing object and has a transparent bottom wall. The specimen is observed by the objective lens unit 51 through the transparent bottom wall of the tray 52. A lens surface 510a at the closest side to the observing object in an objective lens portion 510 of the objective lens unit 51 is immersed in an immersion liquid 520.

The objective lens unit 51 includes a nozzle 530 to supply the immersion liquid 520 to the above-described lens surface 510a. The liquid immersion microscope 5 includes a pump 53. This pump 53 supplies the immersion liquid 520 to the above-described lens surface 510a via the nozzle 530.

SUMMARY

An objective lens unit for a liquid immersion microscope includes: a first liquid passage in a pipe shape including an opening disposed at a lens surface end as a lens surface of a lens at a closest side to an observing object, the first liquid passage being coupled to an outside of the objective lens unit, and a second liquid passage in a pipe shape disposed independently from the first liquid passage, the second liquid passage including an opening disposed at a position adjacent to the opening of the first liquid passage on the lens surface end, the second liquid passage being coupled to the outside of the objective lens unit.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Generally, a liquid immersion microscope intermittently supplies an immersion liquid. In view of this, there is a period in which liquid supply is absent. During this period, there possibly be a case in which the immersion liquid 520 at a distal end of the nozzle 530 that is in contact with an external air vaporizes, then an air gets into this portion, and an air bubble is mixed in the immersion liquid when the liquid supply is started next time.

When the lens surface 510a is immersed in the immersion liquid 520 thus mixed with the air bubble, the mixed air bubble possibly hinders an observation. The immersion liquid 520 is additionally supplied from the nozzle 530 in order to remove the mixed air bubble in the immersion liquid. The immersion liquid 520 without including the air bubble flushes out the air bubble outside the lens surface 510a. As a result, a large amount of immersion liquid 520 is consumed. In view of this, a frequency of replenishing a tank storing the immersion liquid 520 increases to lower a throughput of the observation.

One of the purposes of the present disclosure is to provide an objective lens unit that ensures a reduced consumption quantity of an immersion liquid when a mixed air bubble is removed and a liquid immersion microscope including this objective lens unit.

An objective lens unit for a liquid immersion microscope as a first aspect of the present disclosure includes: a first liquid passage in a pipe shape including an opening disposed at a lens surface end as a lens surface of a lens at a closest side to an observing object, the first liquid passage being coupled to an outside of the objective lens unit, and a second liquid passage in a pipe shape disposed independently from the first liquid passage, the second liquid passage including an opening disposed at a position adjacent to the opening of the first liquid passage on the lens surface end, the second liquid passage being coupled to the outside of the objective lens unit.

The first liquid passage may be a flow passage to supply an immersion liquid to the lens surface end, and the second liquid passage may be a flow passage to suction and discharge the immersion liquid that flows out of the opening of the first liquid passage.

The liquid immersion microscope may further include a depression formed on the lens surface end to dispose the opening of the first liquid passage and the opening of the second liquid passage.

The lens at the closest side to the observing object may be a cemented lens including a meniscus lens having a depression in a center of a surface on an observing object side and a small-sized plano-convex lens fitted in the depression in the center of the meniscus lens, and the opening of the first liquid passage and the opening of the second liquid passage may be disposed at a position avoiding overlapping the plano-convex lens.

The first liquid passage and the second liquid passage may be disposed so as to avoid projecting to the observing object side with respect to the lens surface end.

The liquid immersion microscope may further include a cover that houses the lens at the closest side to the observing object. The cover may include a groove to house the first liquid passage and the second liquid passage.

A liquid immersion microscope as a second aspect of the present disclosure includes: the objective lens unit of the first aspect; a supply mechanism that supplies an immersion liquid to the lens surface end via the first liquid passage; a discharge mechanism that discharges the immersion liquid via the second liquid passage; and a controller that controls operations of the supply mechanism and the discharge mechanism. The controller causes a supplying operation of the immersion liquid and a discharging operation of the immersion liquid to be simultaneously performed at a start of supplying the immersion liquid and causes the discharging operation of the immersion liquid to be precedingly terminated.

According to the above-described aspect of the present disclosure, an objective lens unit that ensures a reduced consumption quantity of an immersion liquid when a mixed air bubble is removed and a liquid immersion microscope including this objective lens unit are provided.

Figure 1:
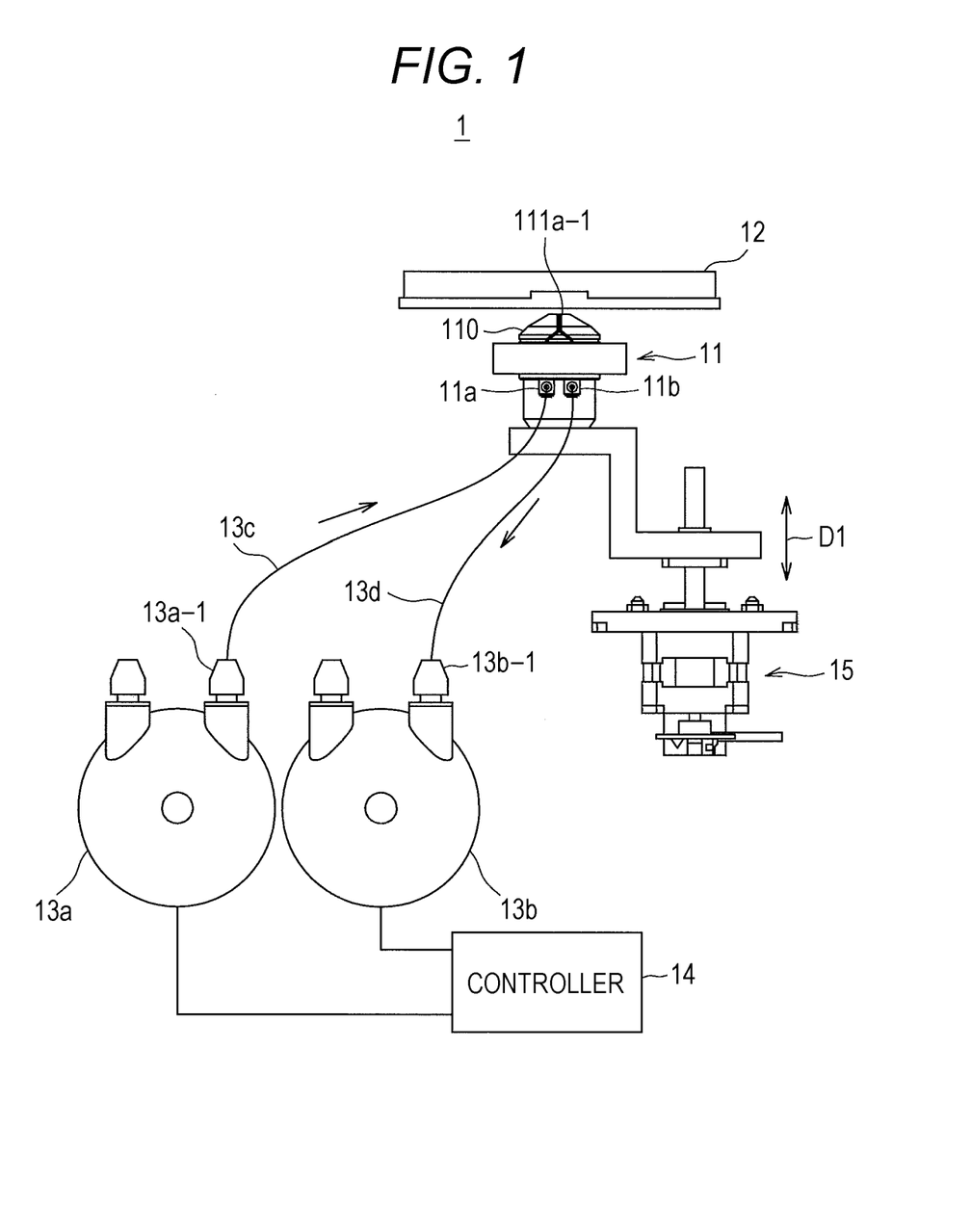
FIG. 1 is a schematic diagram illustrating a liquid immersion microscope according to one embodiment of the present disclosure.

The following describes an embodiment of the present disclosure with reference to the drawings. FIG. 1 is a schematic diagram illustrating a liquid immersion microscope according to one embodiment of the present disclosure. A liquid immersion microscope 1 illustrated in this FIG. 1 is what is called an inverted liquid immersion microscope, which is used for a fluorescent observation of a cell as an observing object.

The liquid immersion microscope 1 includes an objective lens unit 11. In the liquid immersion microscope 1, the objective lens unit 11 is disposed below a tray 12 that cultures the cell as the observing object inside and has a transparent bottom wall. The cell as the observing object is observed by the objective lens unit 11 through the transparent bottom wall of the tray 12. While the detail will be described later, a lens surface (lens surface end) 111a-1 at the closest side to the observing object in an objective lens portion 110 of this objective lens unit 11 is immersed in the immersion liquid. While it is not specified here, as the immersion liquid, a liquid high in refractive index, such as water and oil, is used.

The liquid immersion microscope 1 further includes a supply pump 13a, a discharge pump 13b, and a controller 14 that controls operations of these pumps 13a and 13b. The supply pump 13a is a pump to supply the immersion liquid to the objective lens unit 11. The discharge pump 13b is a pump to discharge the immersion liquid from the objective lens unit 11.

A delivery port 13a-1 of the immersion liquid in the supply pump 13a is coupled to an inlet port 11a of the immersion liquid in the objective lens unit 11 with a supply hose 13c. An inlet port 13b-1 of the immersion liquid in the discharge pump 13b is coupled to a discharge port 11b of the immersion liquid in the objective lens unit 11 with a discharge hose 13d. Furthermore, the liquid immersion microscope 1 includes a lens moving mechanism 15. The lens moving mechanism 15 causes the objective lens unit 11 to come close to and separate from the tray 12 along a vertical direction D1 by a motor drive.

The supply pump 13a is included in a supply mechanism that supplies the immersion liquid to the lens surface 111a-1 via a liquid supply passage 120 (described later) in the liquid immersion microscope 1. The discharge pump 13b is included in a discharge mechanism that discharges the immersion liquid via a liquid discharge passage 130 (described later) in the liquid immersion microscope 1. The controller 14 controls operations of the supply mechanism (supply pump 13a) and the discharge mechanism (discharge pump 13b).

Here, in this embodiment, a confocal microscope is employed as the liquid immersion microscope 1. The confocal microscope produces a microscopic image by selecting only the lights from a focal surface of the objective lens portion 110 out of fluorescent lights from the cells as the observing object. The liquid immersion microscope 1 includes an optical system constituting the confocal microscope, an excitation light source that causes the fluorescent light to occur by illuminating the cell as the observing object, an imaging element that generates an image signal from the received fluorescent light, and the like. However, these members are omitted from the illustration and the description here.

Figure 2:
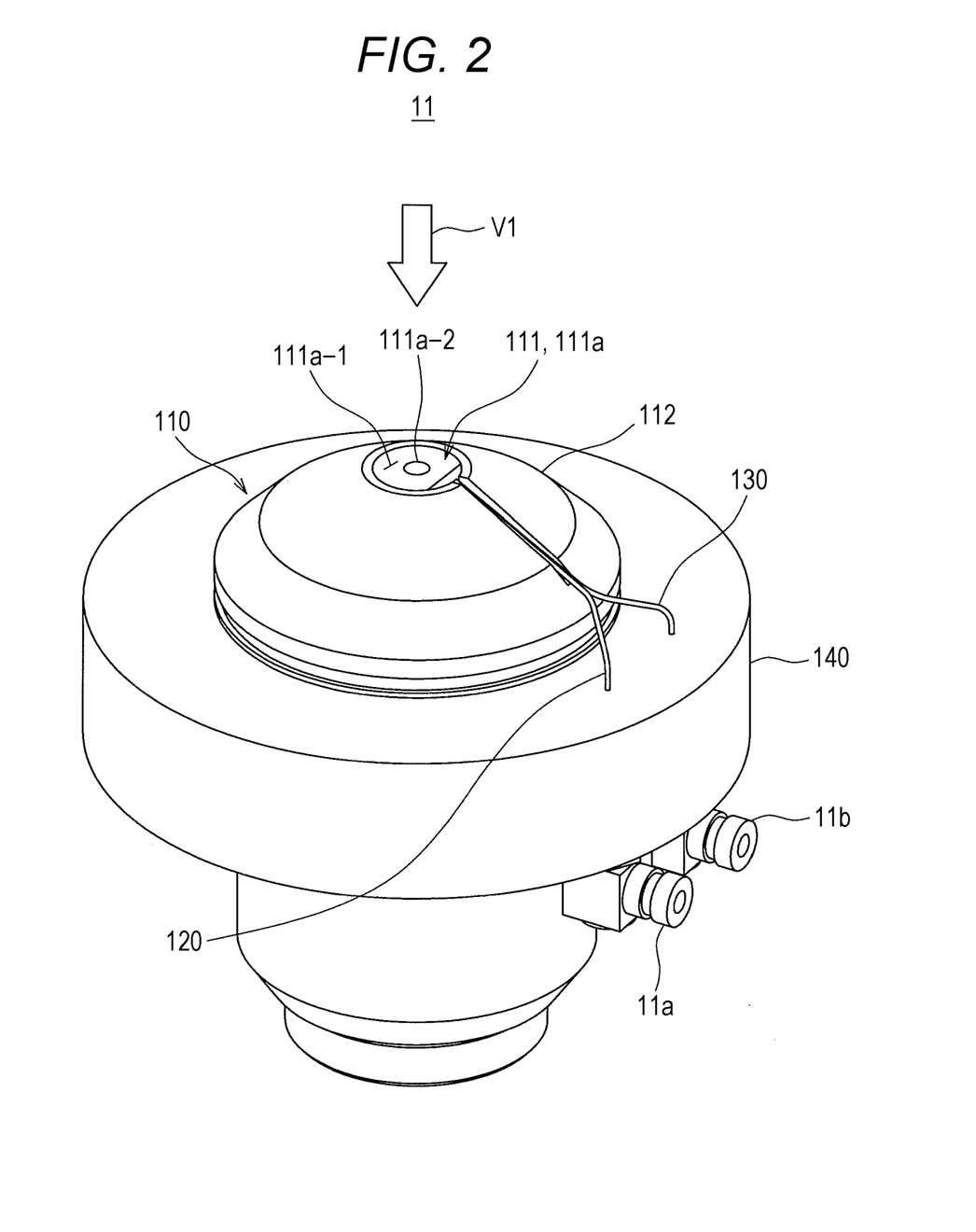
FIG. 2 is a perspective view of an objective lens unit of the liquid immersion microscope illustrated in FIG. 1.
Figure 3A:
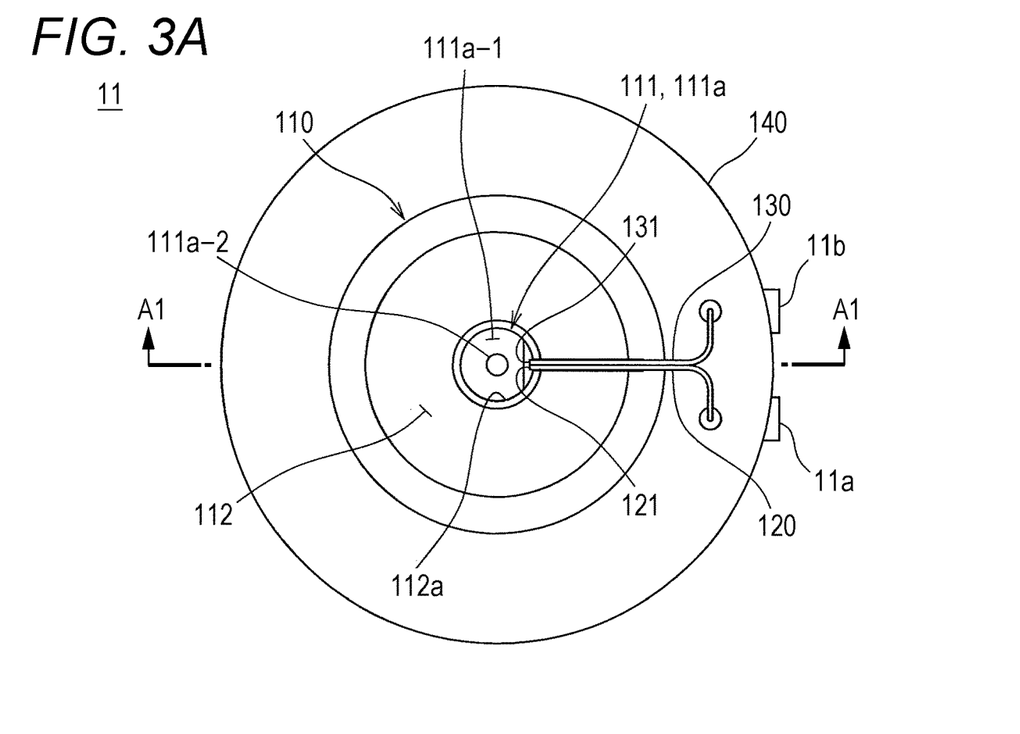
FIG. 3A is a top view of the objective lens unit illustrated in FIG. 2
Figure 3B:
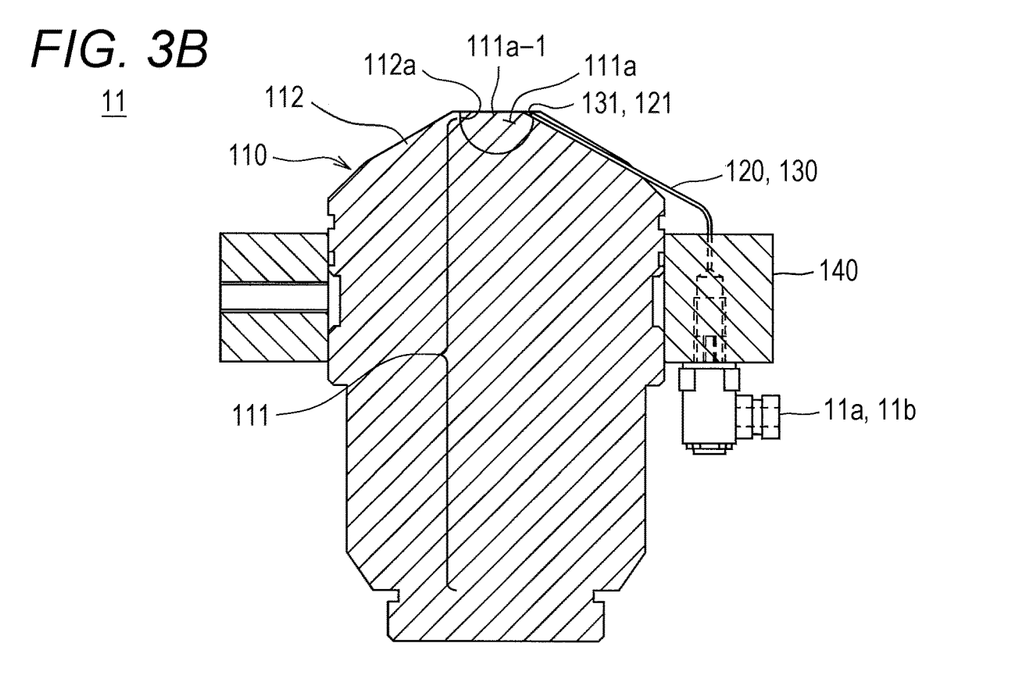
FIG. 3B is a cross-sectional view of this objective lens unit.

FIG. 2 is a perspective view of the objective lens unit 11 of the liquid immersion microscope 1 illustrated in FIG. 1. FIG. 3A is a top view of the objective lens unit 11 illustrated in FIG. 2 and FIG. 3B is a cross-sectional view of this objective lens unit. FIG. 3A is a top view in which the objective lens unit 11 is viewed from a V1 direction in FIG. 2. FIG. 3B is a schematic cross-sectional view of a cross section A1-A1 in FIG. 3A.

The objective lens unit 11 includes the objective lens portion 110. The objective lens portion 110 includes a metallic cover 112 in a cylindrical shape. The cover 112 internally houses a lens group 111. In FIG. 3B, the lenses other than a lens (hereinafter referred to as a top lens) 111a at the closest side to the observing object out of the lens group 111 are omitted from the illustration. An observing object side of the cover 112 has a shape of a conical cap whose distal end includes an opening 112a.

The objective lens unit 11 includes the liquid supply passage 120, the liquid discharge passage 130, and a ring-shaped base 140. The liquid supply passage (first liquid passage) 120 is a flow passage to supply the immersion liquid to the lens surface 111a-1 of the top lens 111a. The liquid discharge passage (second liquid passage) 130 is a flow passage to suction and discharge the immersion liquid that flows out of a supply port 121 of the liquid supply passage 120 simultaneously with the flow out when the flow out is started before the immersion liquid reaches an optical range 111a-2 (described later) in the lens surface 111a-1.

The optical range 111a-2 is a range in a center of the lens surface 111a-1 and is an optical range through which an observation light from the cell as the observing object, which forms an image as a microscopic image, passes. The top lens 111a and the optical range 111a-2 in the lens surface 111a-1 will be described again later.

The liquid discharge passage 130 suctions and discharges the immersion liquid that flows out of the supply port 121 of the liquid supply passage 120 simultaneously with the flow out when the flow out is started before the immersion liquid reaches the optical range 111a-2. In view of this, the liquid discharge passage 130 includes a suction port 131. The liquid discharge passage 130 is disposed such that the suction port 131 is disposed adjacent to the supply port 121. Both the liquid supply passage 120 and the liquid discharge passage 130 serve as pipes that cause the immersion liquid to pass through internally.

Thus, the liquid supply passage 120 includes the supply port 121 disposed on the lens surface 111a-1 of the top lens 111a at the closest side to the observing object and is in a pipe shape coupled to an outside of the objective lens unit 11. The liquid discharge passage 130 is independently disposed with the liquid supply passage 120, includes the suction port 131 disposed at a position adjacent to the supply port 121 on the lens surface 111a-1, and is in a pipe shape coupled to the outside of the objective lens unit 11. Furthermore, the liquid supply passage 120 is the flow passage to supply the immersion liquid to the lens surface 111a-1 and the liquid discharge passage 130 is the flow passage to suction and discharge the immersion liquid that flows out of the supply port 121.

The liquid immersion microscope 1 of this embodiment includes such objective lens unit 11. In view of this, the immersion liquid can be suctioned by the adjacent suction port 131 simultaneously with the flow out of the immersion liquid from the supply port 121 at the start of the immersion liquid flow out. In view of this, even in the case where the air bubble is mixed at the start of the flow out, the immersion liquid mixed with the air bubble can be instantaneously removed before spreading. Then, stopping suctioning ensures the lens surface 111a-1 being covered with the immersion liquid without the air bubble. At this time, the immersion liquid wastefully consumed is only the immersion liquid at the start of the flow out that is possibly mixed with the air bubble. In view of this, a consumption quantity of the immersion liquid when the mixed air bubble is removed can be reduced.

The ring-shaped base 140 is installed at an outer periphery of the objective lens portion 110. The inlet port 11a and the discharge port 11b of the immersion liquid are disposed adjacent to an inner periphery of this ring-shaped base 140. An opposite side of the supply port 121 in the liquid supply passage 120 and an opposite side of the suction port 131 in the liquid discharge passage 130 are coupled to the inlet port 11a and the discharge port 11b, respectively, by internally passing through the ring-shaped base 140. The supply pump 13a sends the immersion liquid into the inlet port 11a via the supply hose 13c. Thereafter, the immersion liquid is supplied to the lens surface 111a-1 of the objective lens portion 110 internally passing through the liquid supply passage 120 from the supply port 121.

The ring-shaped base 140 incorporates a heating device, such as a heater (not illustrated). In the tray 12, the cell is cultured in a culture environment of approximately at 37° C. The heating device of the ring-shaped base 140 keeps the temperature of the objective lens portion 110 and the immersion liquid at approximately 37° C. that is appropriate for the culture environment. This ensures restraining a fluctuation of an observation image caused by the temperature change during the cell observation to the minimum. However, the heating device may be omitted.

Figure 4:
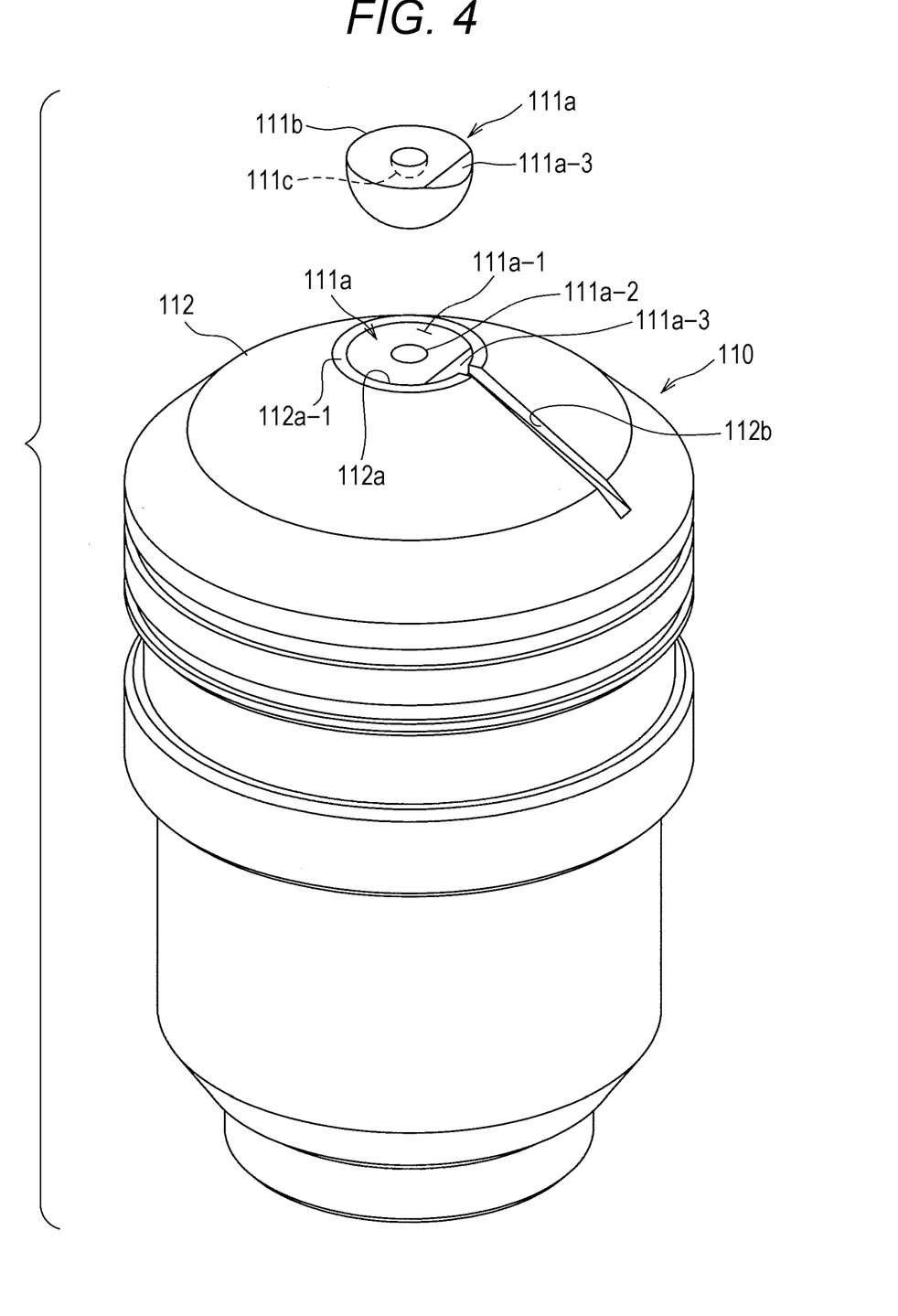
FIG. 4 is a perspective view of an objective lens of the above-described objective lens unit.

FIG. 4 is a perspective view of the objective lens portion 110. This FIG. 4 illustrates the top lens 111a, which is a part of the objective lens portion 110, together with the objective lens portion 110.

In this embodiment, the top lens 111a is a cemented lens including a meniscus lens 111b and a small lens 111c. The meniscus lens 111b has a concavity (depression) in a center of a surface on the observing object side. The small lens 111c is a small-sized plano-convex lens. The small lens 111c is fitted in the concavity in the center of the meniscus lens 111b. A circular-shaped planar surface on the observing object side of the small lens 111c is the optical range 111a-2 on the lens surface 111a-1 of the top lens 111a. The optical range 111a-2 is a range through which the observation light from the observing object, which forms the image as the microscopic image, passes. The lens surface 111a-1 of the top lens 111a as such cemented lens is formed to be a planar surface except for a chamfered portion 111a-3 described below.

In this embodiment, every lens of the lens group 111 of the objective lens portion 110, including such top lens 111a, is made of glass. In the case where the top lens 111a is made of a single lens, a range through which the observation light from the observing object, which forms the image as the microscopic image, passes is also referred to as the optical range.

In the top lens 111a, the chamfered portion (a depression formed at an end of the lens surface) 111a-3, which is a depression, is formed at a part of an outer periphery of the lens surface 111a-1. This chamfered portion 111a-3 is formed so as to avoid overlapping the small lens 111c forming the optical range 111a-2 of the lens surface 111a-1. Accordingly, the supply port 121 of the liquid supply passage 120 and the suction port 131 of the liquid discharge passage 130 are disposed at a position that does not overlap the small lens 111c. That is, the supply port 121 and the suction port 131 are disposed at a position that avoids overlapping the small lens 111c (a position that does not lap over the small lens 111c).

An outer surface of the cover 112 of the objective lens portion 110 includes one groove 112b linearly extending from a skirt of the conical cap portion on the observing object side to the opening 112a at the distal end. The groove 112b is a groove to house the liquid supply passage 120 and the liquid discharge passage 130. That is, the groove 112b internally houses the liquid supply passage 120 and the liquid discharge passage 130 together. An edge 112a-1 of the opening 112a at the distal end has an annular planar surface surrounding the lens surface 111a-1 of the top lens 111a. An end on the observing object side of the groove 112b on the outer surface of the cover 112 communicates to an inside of the opening 112a. A portion of the annular edge 112a-1 that couples to the groove 112b is notched.

In the objective lens portion 110, the cover 112 houses the top lens 111a such that the above-described chamfered portion 111a-3 is opposed to the portion coupled to the groove 112b and notched in the annular edge 112a-1. The lens surface 111a-1 of the top lens 111a is flush with the edge 112a-1 of the opening 112a.

The liquid supply passage 120 and the liquid discharge passage 130 are fitted to such objective lens portion 110 as follows.

Figure 5A:
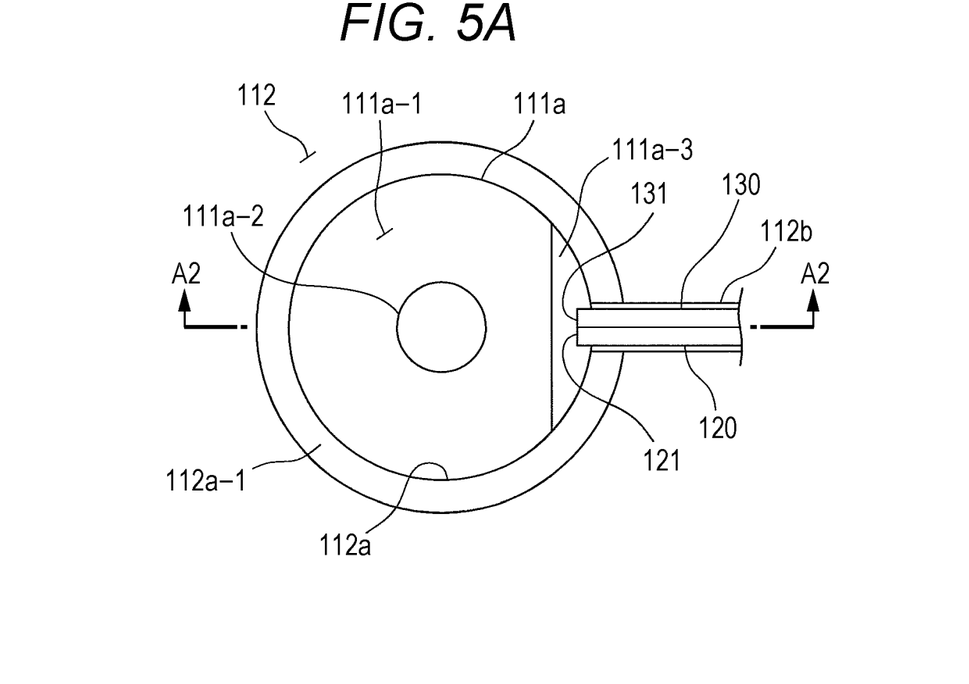
FIGS. 5A and 5B illustrate the objective lens fitted with a liquid supply passage and a liquid discharge passage focusing around a top lens.
Figure 5B:
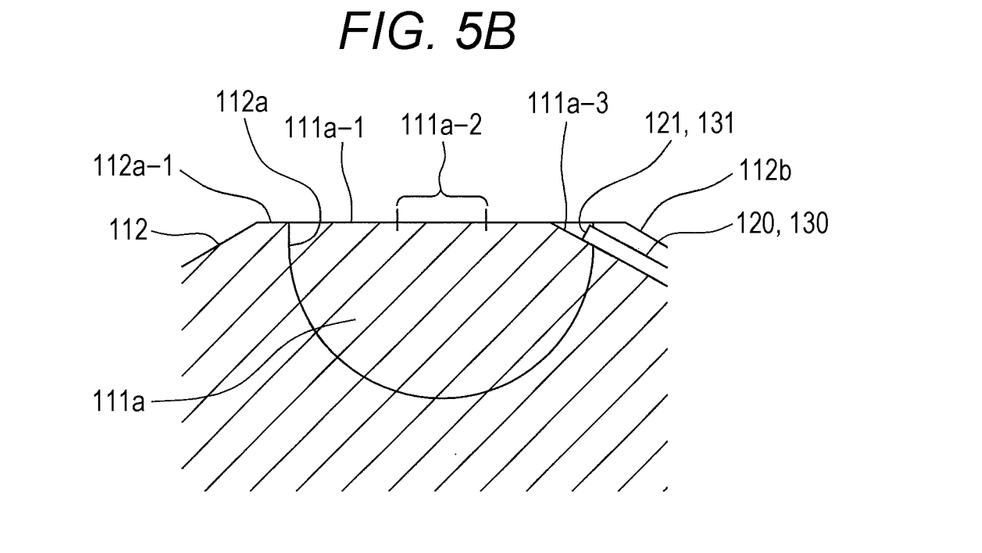

FIGS. 5A and 5B illustrate the objective lens portion 110 fitted with the liquid supply passage 120 and the liquid discharge passage 130 focusing around the top lens. FIG. 5A is a plan view of the top lens 111a that is viewed from the lens surface 111a-1. FIG. 5B illustrates a cross section A2-A2 in FIG. 5A.

The liquid supply passage 120 and the liquid discharge passage 130 are internally housed by the groove 112b disposed on the cover 112. The supply port 121 of the liquid supply passage 120 projects from the notched portion of the edge 112a-1 of the opening 112a of the cover 112 to a position slightly overlapping an upper portion of the chamfered portion 111a-3 of the top lens 111a. That is, the supply port 121 of the liquid supply passage 120 is positioned closer to the optical range 111a-2 through which the observation light passes than the outer periphery of the lens surface 111a-1 of the top lens 111a is. The suction port 131 of the liquid discharge passage 130 is disposed at the proximity of the supply port 121 of this liquid supply passage 120. Similarly to the supply port 121, the suction port 131 also projects to the position slightly overlapping the upper portion of the chamfered portion 111a-3 of the top lens 111a. The suction port 131 of the liquid discharge passage 130 is also positioned closer to the optical range 111a-2 than the outer periphery of the lens surface 111a-1 of the top lens 111a is. Thus, the chamfered portion 111a-3 is the depression to dispose the supply port 121 and the suction port 131.

The chamfered portion 111a-3 of the top lens 111a is formed such that the supply port 121 and the suction port 131 that overlap the upper portion of the chamfered portion 111a-3 avoid projecting to the observing object side with respect to the lens surface 111a-1 including the optical range 111a-2. That is, a space partitioned by the chamfered portion 111a-3 of the top lens 111a and an inner wall surface of the opening 112a of the cover 112 and depressed from the lens surface 111a-1 serves as a housing portion of the supply port 121 and the suction port 131. Thus, the liquid supply passage 120 (supply port 121) and the liquid discharge passage 130 (suction port 131) are disposed so as to avoid projecting to the observing object side with respect to the lens surface 111a-1.

An opposite side to the supply port 121 in the liquid supply passage 120 and an opposite side to the suction port 131 in the liquid discharge passage 130 come out of the groove 112b of the cover 112, as illustrated in FIG. 2 and FIG. 3A, split into two ways toward the ring-shaped base 140, internally pass through the ring-shaped base 140, and then are coupled to the inlet port 11a and the discharge port 11b, respectively.

Here, in this embodiment, supply of the immersion liquid to the lens surface 111a-1 of the top lens 111a is performed as follows by operations of the supply pump 13a and the discharge pump 13b under control of the controller 14 illustrated in FIG. 1.

Figure 6A:
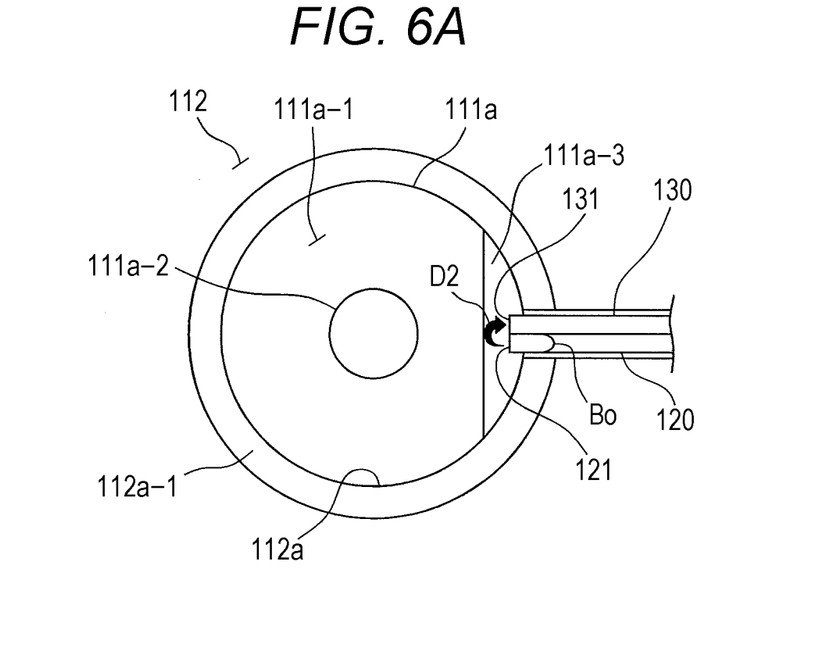
FIGS. 6A and 6B are schematic diagrams illustrating a state in which an immersion liquid is supplied to a lens surface of the top lens.
Figure 6B:
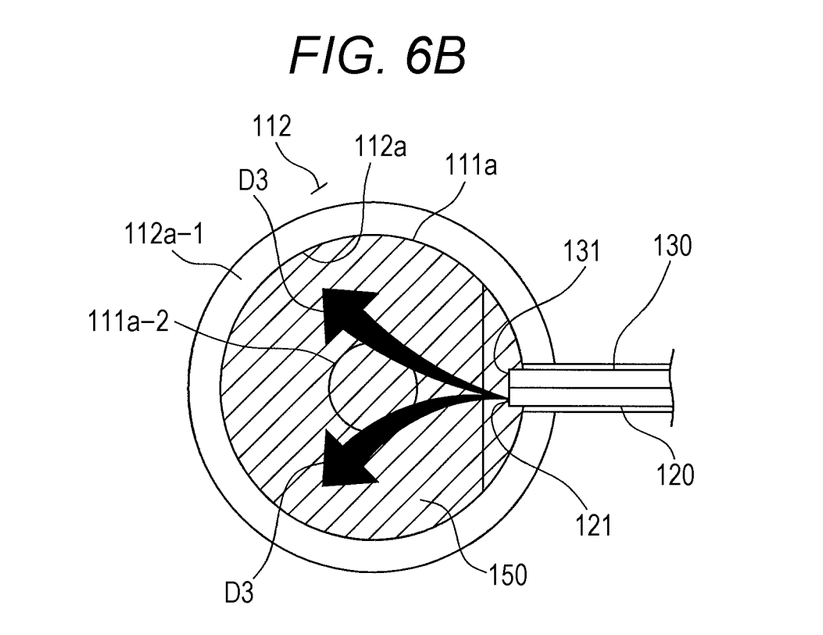

FIGS. 6A and 6B are schematic diagram illustrating a state in which the immersion liquid is supplied to the lens surface 111a-1 of the top lens 111a. FIG. 6A schematically illustrates a state at an early stage of the immersion liquid supply to the lens surface 111a-1. FIG. 6B schematically illustrates a state in which approximately a whole region of the lens surface 111a-1 is immersed with the immersion liquid.

As illustrated in FIG. 6A, when the immersion liquid is supplied after a certain amount of time has passed since a completion of the last use of the liquid immersion microscope 1, there is a case where the immersion liquid mixed with an air bubble Bo flows out of the supply port 121 of the liquid supply passage 120 at an early stage of the immersion liquid supply. This is caused by dryness inside the liquid supply passage 120 during an unused time and the like. Immersing the optical range 111a-2 through which the observation light passes on the lens surface 111a-1 in the immersion liquid thus mixed with the air bubble Bo possibly causes the mixed air bubble Bo to hinder the observation.

Therefore, in this embodiment, the controller 14 illustrated in FIG. 1 controls the operations of the supply pump 13a and the discharge pump 13b such that the supply and the discharge of the immersion liquid are simultaneously performed from the start of the immersion liquid supply for a predetermined period. That is, the controller 14 controls the supply pump 13a and the discharge pump 13b at the start of the immersion liquid supply to cause a supplying operation of the immersion liquid and a discharge operation of the immersion liquid to be simultaneously performed.

This causes the suction port 131 of the liquid discharge passage 130 to suction and discharge the immersion liquid flown out of the supply port 121 of the liquid supply passage 120 as an arrow D2 indicates before the immersion liquid exceeds the chamfered portion 111a-3 of the top lens 111a at the early stage. That is, at this stage, the immersion liquid flown out of the supply port 121 of the liquid supply passage 120 is discharged before reaching the optical range 111a-2 on the lens surface 111a-1 of the top lens 111a.

This avoids immersing the optical range 111a-2 with such immersion liquid even when the immersion liquid flown out of the supply port 121 has the air bubble Bo mixed. In this embodiment, as a period in which the supply and the discharge of the immersion liquid are thus simultaneously performed (the above-described predetermined period), a period that takes for discharging the immersion liquid of approximately a whole length of the liquid supply passage 120 from the start of the immersion liquid supply is employed with some margin considered.

Over such predetermined period, the supply and the discharge of the immersion liquid is simultaneously performed. Afterwards, the controller 14 controls the discharge pump 13b to precedingly terminate the discharge operation of the immersion liquid. That is, under the control of the controller 14, the discharge pump 13b is stopped and the supply of the immersion liquid by the operation of the supply pump 13a is performed. In view of this, as indicated by an arrow D3 in FIG. 6B, approximately the whole region of the lens surface 111a-1 including the optical range 111a-2 is immersed with an immersion liquid 150 substantially not including the air bubble.

Here, the edge 112a-1 of the opening 112a in the metallic cover 112 forms the annular planar surface of the cover 112 surrounding the lens surface 111a-1. This edge 112a-1 is approximately flush with the planar lens surface 111a-1. The metallic edge 112a-1 has a large contact angle of the immersion liquid 150 compared with the lens surface 111a-1 of the top lens 111a made of the glass. That is, an affinity of the edge 112a-1 for the immersion liquid 150 is smaller than that of the lens surface 111a-1. In view of this, the immersion liquid 150 that expands as indicated by an arrow D3 in FIG. 6B is repelled at the edge 112a-1 upon reaching the edge 112a-1 of the opening 112a in the cover 112. Therefore, the immersion liquid 150 is less likely to be spilt out to the edge 112a-1. Thus, the immersion liquid 150 spreads the whole region of the lens surface 111a-1 in a state of being retained on the lens surface 111a-1. Afterwards, the controller 14 stops the supply pump 13a to terminate the supplying operation of the immersion liquid.

As illustrated in FIG. 1, the tray 12 inside which the cell as the observing object is cultured is arranged above the objective lens portion 110.

Figure 7A:
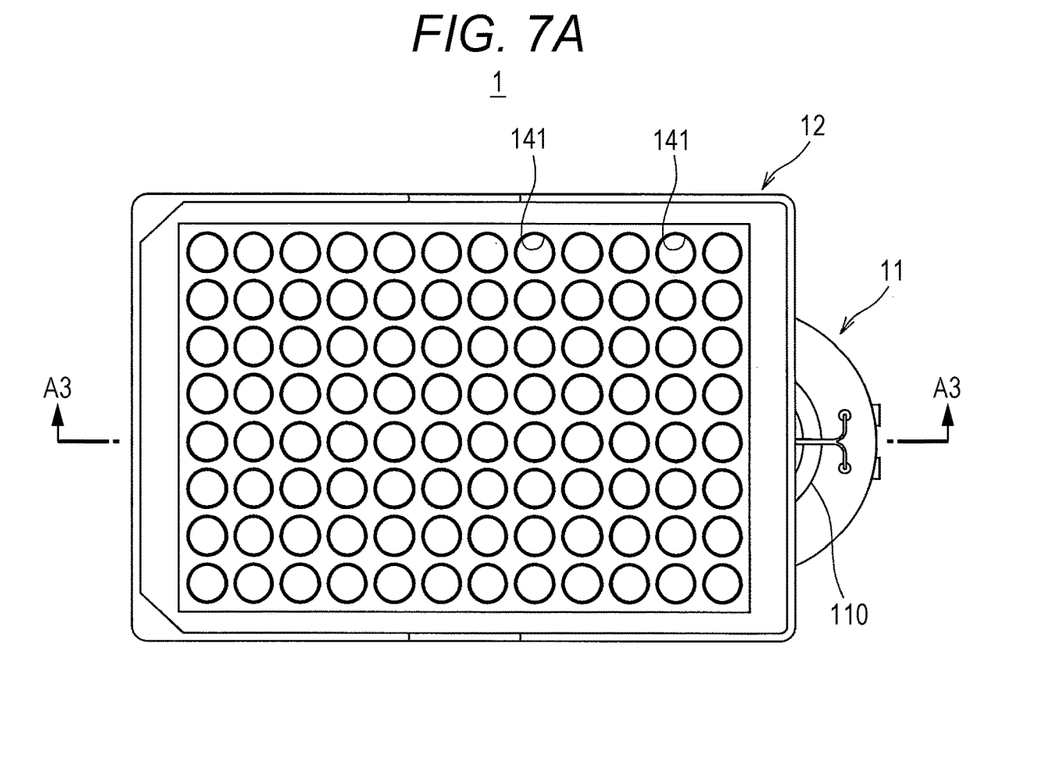
FIGS. 7A and 7B illustrate the objective lens unit illustrated in FIG. 1 together with a tray inside which a cell as the observing object is cultured.
Figure 7B:
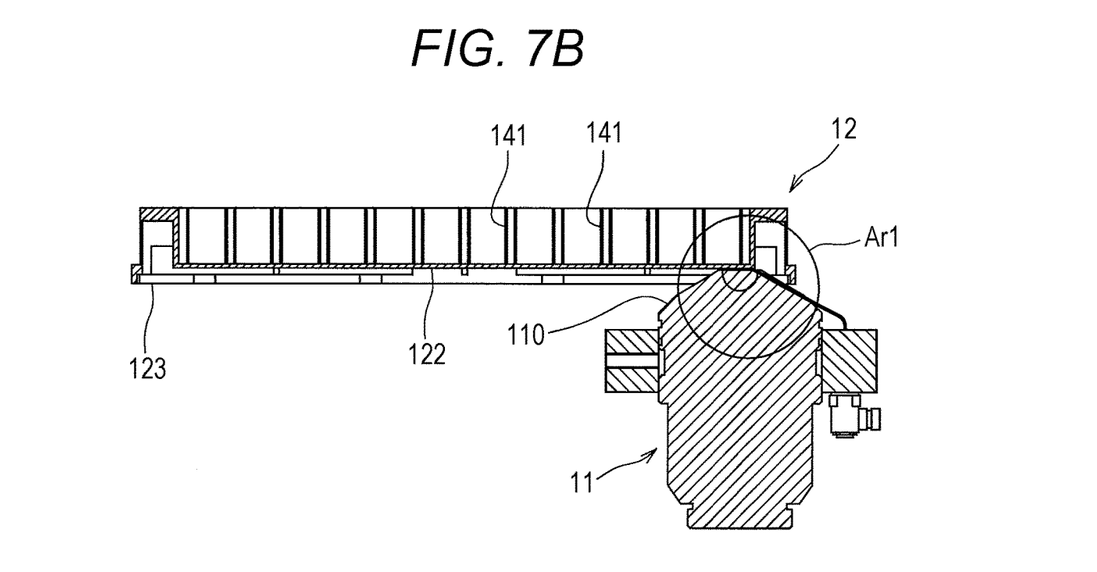
Figure 8:
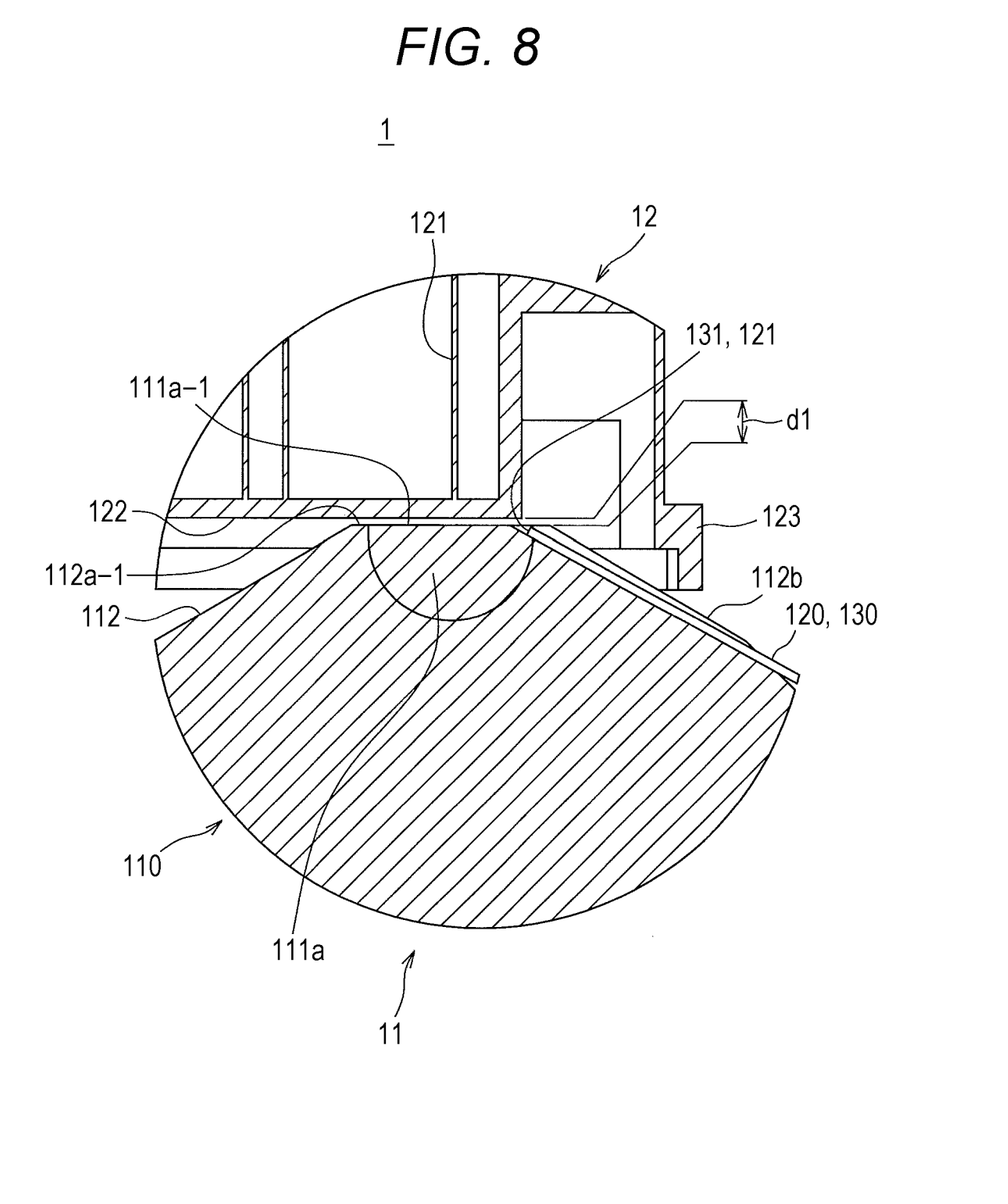
FIG. 8 is an enlarged view of an area Ar1 in FIG. 7B.

FIGS. 7A and 7B illustrate the objective lens unit 11 illustrated in FIG. 1 together with the tray 12 inside which the cell as the observing object is cultured. FIG. 7A is a top view viewing the objective lens unit 11 and the tray 12 from a side of the tray 12. FIG. 7B is a schematic cross-sectional view of a cross section A3-A3 in FIG. 7A. FIG. 8 is an enlarged view of an area Ar1 in FIG. 7B.

As illustrated in FIGS. 7A and 7B, in this embodiment, a multiwell plate is employed as the tray 12. That is, in the tray 12, a plurality of wells 141 are two-dimensionally arrayed. Inside each of the wells 141, the cell as the observing object is cultured. Through a transparent bottom wall 122, the observation is performed by the objective lens portion 110 of the objective lens unit 11. A stepped wall 123 surrounding an outer periphery of the tray 12 is disposed upright on a side of the objective lens unit 11 (back surface side) in the tray 12. This stepped wall 123 surrounding the outer periphery of the tray 12 restrains a fluctuation of the culture environment, such as the temperature and the humidity, in the back surface side of the tray 12.

The objective lens unit 11 is relatively moved in an optical axis direction with respect to such tray 12 by the lens moving mechanism 15. The objective lens unit 11 is relatively moved in a direction intersecting with the optical axis direction by a moving mechanism (not illustrated). In the relative movement in the optical axis direction, a clearance d1 between the lens surface 111a-1 of the top lens 111a in the objective lens portion 110 and the bottom wall of the tray 12 is controlled so as to be approximately 0.2 to 0.3 mm. The immersion liquid 150 supplied as described above spreads around this slight clearance by capillarity. Via this immersion liquid 150, the cell as the observing object inside the tray 12 is observed.

The following describes two alternative examples of the top lens in the objective lens portion 110.

Figure 9:
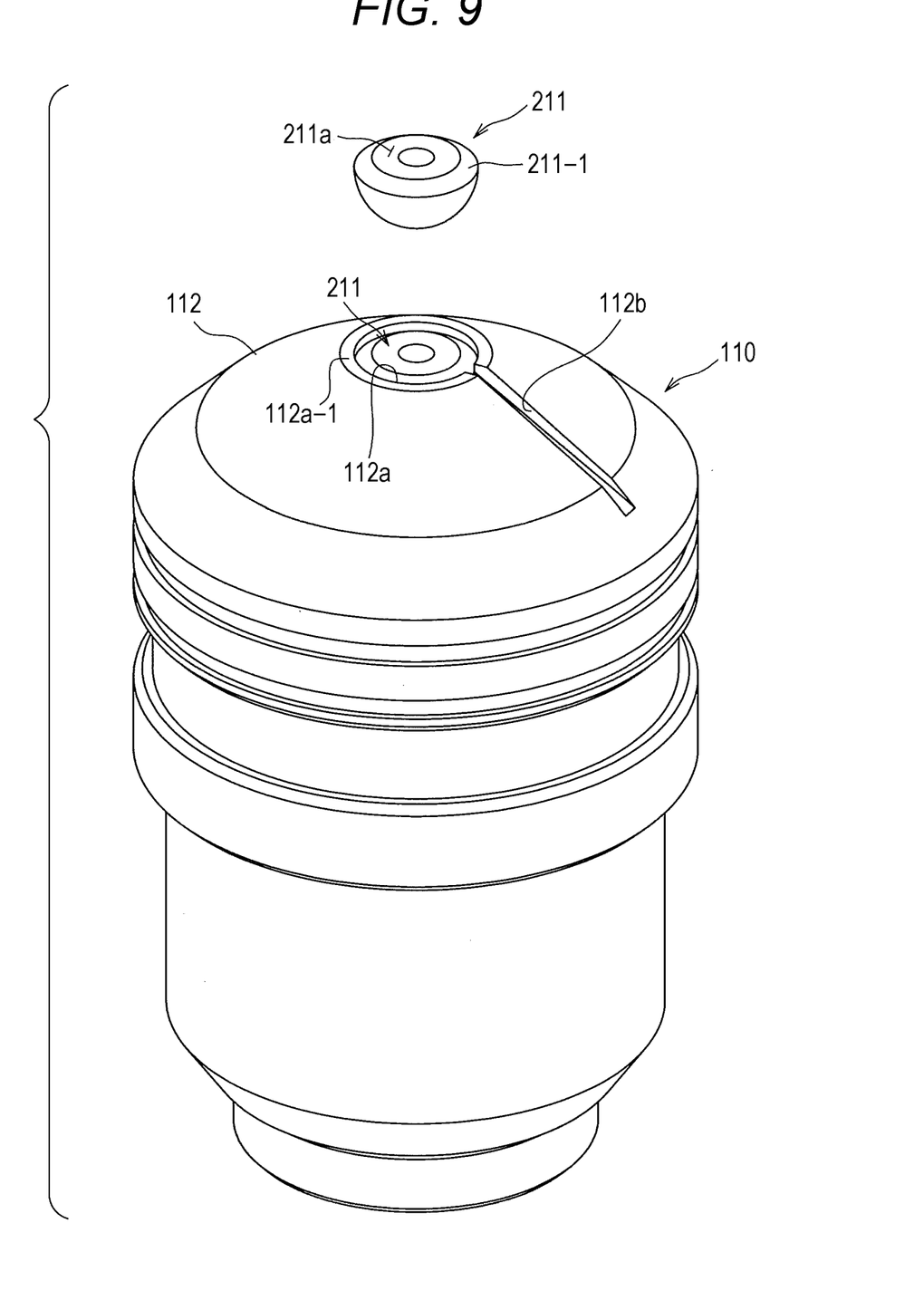
FIG. 9 illustrates a first alternative example of the top lens in the objective lens.

FIG. 9 illustrates a first alternative example of the top lens (a top lens 211) in the objective lens portion 110. In this FIG. 9, components other than the top lens 211 are similar to the components illustrated in FIG. 4. In FIG. 9, these similar components are attached with identical reference numerals to FIG. 4. The following omits a repeated explanation for these similar components. The same applies to FIG. 10 that illustrates a second alternative example of the top lens described later.

The top lens 211 of the alternative example illustrated in FIG. 9 is also the cemented lens including the meniscus lens and the small lens, similar to the top lens 111a illustrated in FIG. 4. Except that the top lens 211 of this alternative example includes a chamfered portion 211-1 around a whole circumference of an outer periphery of a lens surface 211a. In this alternative example, a space partitioned by the chamfered portion 211-1 around the whole circumference and an inner wall surface of the opening 112a of the cover 112 and depressed from the lens surface 211a serves as a housing portion of the supply port 121 and the suction port 131 projected from the groove 112b of the cover 112.

Figure 10:
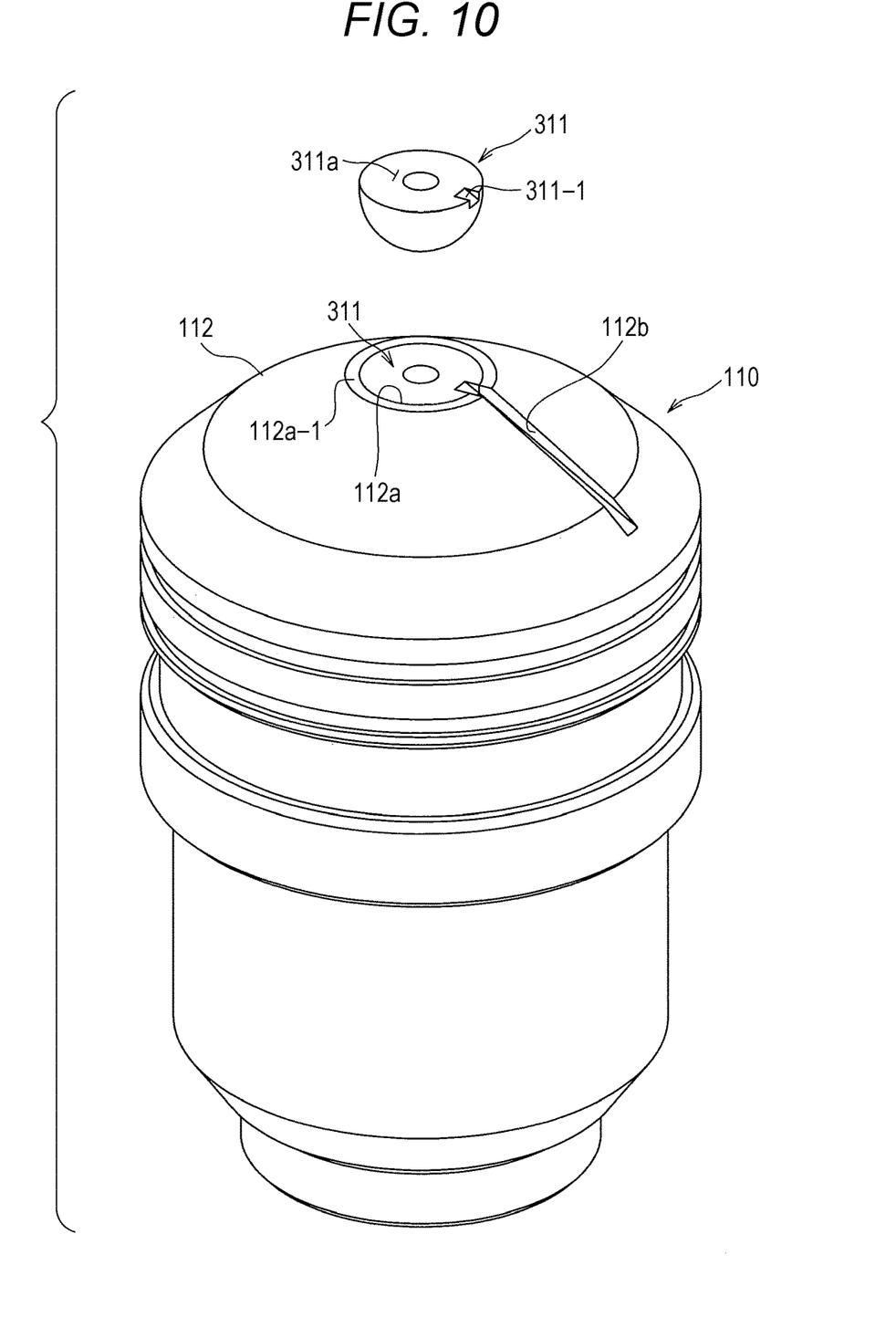
FIG. 10 illustrates a second alternative example of the top lens in the objective lens.

FIG. 10 illustrates the second alternative example (a top lens 311) of the top lens in the objective lens portion 110.

The top lens 311 of the alternative example illustrated in FIG. 10 is also the cemented lens including the meniscus lens and the small lens, similar to the top lens 111a illustrated in FIG. 4. Except that the top lens 311 of this alternative example includes a depression portion 311-1. A formation position of this depression portion 311-1 is a position corresponding to the end of the groove 112b of the cover 112 on a side of the opening 112a in an outer periphery of the lens surface 311a. A width of this depression portion 311-1 is approximately identical to a width of the groove 112b of the cover 112. The depression portion 311-1 has a shape with which a depth from the lens surface 311a gradually increases toward the end of the groove 112b on the opening 112a side. In this alternative example, a space inside the depression portion 311-1 itself serves as the housing portion of the supply port 121 and the suction port 131 projecting from the groove 112b of the cover 112.

The liquid immersion microscope 1 and the objective lens unit 11 of this embodiment including these two alternative examples include the liquid discharge passage 130. The liquid discharge passage 130 includes the suction port 131 disposed at the proximity of the supply port 121 of the liquid supply passage 120. This liquid discharge passage 130 is the flow passage to suction and discharge the immersion liquid flown out of the supply port 121 of the liquid supply passage 120 before reaching the optical range 111a-2 through which the observation light forming the image as the microscopic image passes on the lens surface 111a-1 of the top lens 111a. In this embodiment, under the control of the controller 14, the immersion liquid is suctioned and discharged before reaching the above-described optical range 111a-2 until the immersion liquid mixed with the air bubble Bo is completely flown out of the liquid supply passage 120. This ensures immersing the lens surface 111a-1 in the immersion liquid while restraining the immersion liquid mixed with the air bubble Bo from impregnating the lens surface 111a-1 of the top lens 111a.

Here, in this embodiment, the immersion liquid flown out of the supply port 121 of the liquid supply passage 120 is repelled by the edge 112a-1 of the metallic cover 112 having the affinity smaller than that of the lens surface 111a-1 made of the glass for the immersion liquid. This immerses the lens surface 111a-1 with the immersion liquid almost without leaking outside. Thus, according to this embodiment, the immersion liquid is directly supplied to the lens surface 111a-1. In view of this, the supply amount of the immersion liquid can be reduced to the minimum necessary.

In this embodiment, the supply port 121 of the liquid supply passage 120 and the suction port 131 of the liquid discharge passage 130 do not project to the observing object side with respect to the optical range 111a-2 on the lens surface 111a-1 of the top lens 111a. In view of this, interference of the supply port 121 and the suction port 131 with the tray 12 can be restrained. This ensures bringing the optical range 111a-2 close to the observing object until the clearance d1 between the lens surface 111a-1 (the optical range 111a-2) and the bottom wall of the tray 12 becomes approximately 0.2 to 0.3 mm. This ensures performing the observation with a deep observation depth in the optical axis direction, namely, a wide observation range in the optical axis direction.

Here, the objective lens for the liquid immersion microscope typically has a large numerical aperture. In view of this, an observation light with a large divergence angle (diffraction angle) can enter from the observing object to the lens (the top lens 111a) at the closest side to the observing object. In this embodiment, the above-described cemented lens is employed as the top lens 111a. In view of this, the observation light with the large divergence angle entering from the observing object is bent in phases with the small lens 111c and the meniscus lens 111b. This reduces an aberration in the objective lens portion 110. The chamfered portion 111a-3 serving as the housing portion housing the supply port 121 of the liquid supply passage 120 and the suction port 131 of the liquid discharge passage 130 is disposed so as to avoid overlapping the small lens 111c in the center of the cemented lens. As a result, without substantially hindering a restraint of the aberration by employing the cemented lens, the supply port 121 and the suction port 131 are housed in the above-described housing portion.

In this embodiment, the liquid supply passage 120 and the liquid discharge passage 130 are internally housed in the groove 112b disposed on the outer surface of the cover 112 in the objective lens portion 110. This causes the objective lens portion 110 itself to ensure restraining the interference with a peripheral portion, such as the stepped wall 123 disposed upright on the back surface of the tray 12 for stabilizing the culture environment, illustrated in FIGS. 7A, 7B, and 8. This ensures a wide moving range of the objective lens unit 11 in a horizontal direction intersecting with the optical axis. As a result, an observation with a wide observation range in this direction can be performed.

In this embodiment, the immersion liquid of approximately the whole length of the liquid supply passage 120 is discharged at the stage when the immersion liquid supply is started. This ensures discharging the immersion liquid until the immersion liquid mixed with the air bubble Bo is completely flown out of the liquid supply passage 120 regardless of an amount of the air bubble Bo inside the liquid supply passage 120 at a stage the supply is started.

The embodiment described above is merely illustrated a representative configuration of the technique of the present disclosure. The technique of the present disclosure is not limited to this embodiment. That is, the above-described embodiment can be modified in various ways without departing from the gist of the technique of the present disclosure. Thus modified embodiments are certainly included in the scope of the present disclosure as long as the configurations of the objective lens unit and the liquid immersion microscope of the present disclosure are included.

For example, in the above-described embodiment, the liquid immersion microscope 1 as the inverted confocal microscope is illustrated as an example of the liquid immersion microscope according to the present disclosure. However, the liquid immersion microscope according to the present disclosure is not limited to this, and any specific aspect may be included as long as it is the liquid immersion microscope.

In the above-described embodiment, the objective lens unit 11 including the ring-shaped base 140 incorporating the heating device is illustrated as an example of the objective lens unit according to the present disclosure. However, the objective lens unit according to the present disclosure may include any specific aspect as long as the objective lens for the liquid immersion microscope is included.

In the above-described embodiment, the one liquid supply passage 120 and the one liquid discharge passage 130 are illustrated as an example of the first liquid passage and the second liquid passage according to the present disclosure. However, the first liquid passage and the second liquid passage according to the present disclosure are not limited to these. For example, the liquid supply passage that supplies the immersion liquid may be plural and the liquid discharge passage that suctions and discharges the immersion liquid may be one. Alternatively, the liquid supply passage that supplies the immersion liquid may be plural and the liquid discharge passage that suctions and discharges the immersion liquid may be plural. The first liquid passage and the second liquid passage according to the present disclosure may include any specific aspect as long as openings of respective liquid passages are disposed adjacent to one another.

In the above-described embodiment, the respective lens surfaces 111a-1, 211a, and 311a of the top lenses 111a, 211, and 311 as the cemented lenses are illustrated as examples of the lens surface at the closest side to the observing object according to the present disclosure. However, the lens surfaces at the closest side to the observing object according to the present disclosure are not limited to these, and may be a lens surface of a single lens or the like and may include any specific aspect.

In the above-described embodiment, the following three examples are illustrated as examples of the depression in which the openings are disposed according to the present disclosure. First, FIG. 4 exemplarily illustrates the chamfered portion 111a-3 disposed at the part of the outer periphery of the lens surface 111a-1. FIG. 9 exemplarily illustrates the chamfered portion 211-1 disposed around the whole circumference of the outer periphery of the lens surface 211a. FIG. 10 exemplarily illustrates the depression portion 311-1 disposed at the part of the outer periphery of the lens surface 111a-1. However, the depressions in which the openings are disposed according to the present disclosure are not limited to these. The shape of the depression itself and the portion of the lens forming the part of the depression may include any specific aspect.

In the above-described embodiment, the one groove 112b that internally houses the liquid supply passage 120 and the liquid discharge passage 130 together is illustrated as an example of the groove according to the present disclosure. However, the groove according to the present disclosure is not limited to this, for example, two grooves that merge near the opening of the cover. The groove according to the present disclosure may include any specific aspect, such as the number and the shape of the groove.

The chamfered portion 111a-3 may be formed so as not to overlap the small lens 111c that forms the optical range 111a-2 of the lens surface 111a-1. The chamfered portion 111a-3 may be formed such that the supply port 121 and the suction port 131 that overlap the upper portion of the chamfered portion 111a-3 do not project to the observing object side with respect to the lens surface 111a-1 including the optical range 111a-2.

In this embodiment, the lens surface 111a-1 of the top lens 111a can be immersed in the immersion liquid while the mixture of the air bubble Bo is restrained.

The embodiment of the present disclosure may be the following first to fifth objective lens unit and first liquid immersion microscope.

The first objective lens unit is an objective lens unit for an inverted liquid immersion microscope and includes a first liquid passage and a second liquid passage. The first liquid passage is in a pipe shape with an opening disposed at a lens surface end at a closest side to an observing object. The first liquid passage is coupled to an outside of the objective lens unit. The second liquid passage is in a pipe shape disposed independently from the first liquid passage. The second liquid passage includes an opening at a position adjacent to the opening of the first liquid passage on the lens surface end and is coupled to the outside of the objective lens unit.

The second objective lens unit according to the first objective lens unit is configured as follows. The two openings are disposed in a depression formed at the lens surface end.

The third objective lens unit according to the first or the second objective lens unit is configured as follows. The lens at the closest side to the observing object is a cemented lens where a meniscus lens having a depression in a center of a surface on an observing object side is included and a small-sized plano-convex lens is fitted in the depression in the center of the meniscus lens. The two openings are disposed at the position where the two openings do not overlap the small-sized plano-convex lens.

The fourth objective lens unit according to any one of the first to the third objective lens unit is configured as follows. The first liquid passage and the second liquid passage do not project to the observing object side with respect to the lens surface.

The fifth objective lens unit according to any one of the first to the fourth objective lens unit is configured as follows. The lens at the closest side to the observing object is housed in a cover including a groove to house the first liquid passage and the second liquid passage.

The first liquid immersion microscope includes the objective lens unit according to any one of the first to the fifth objective lens unit, a supply mechanism, a discharge mechanism, and a controller. The supply mechanism supplies the immersion liquid from the first liquid passage. The discharge mechanism discharges the immersion liquid from the second liquid passage. The controller controls operations of the supply mechanism and the discharge mechanism. The controller causes a supplying operation of the immersion liquid and a discharging operation of the immersion liquid to be simultaneously performed at a start of supplying the immersion liquid and causes the discharging operation of the immersion liquid to be precedingly terminated.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An objective lens unit for a liquid immersion microscope, the objective lens unit comprising:
    a lens;
    a cover that houses the lens and comprises a groove therein;
    a first liquid passage in a pipe shape including an opening disposed at a lens surface end on a lens surface of the lens at a closest side to an observing object, the first liquid passage being coupled through the groove to an outside of the objective lens unit;
    a second liquid passage in a pipe shape disposed independently from the first liquid passage, the second liquid passage including an opening disposed at a position adjacent to the opening of the first liquid passage on the lens surface end, the second liquid passage being coupled through the groove to the outside of the objective lens unit; and
    a depression formed in the lens on the lens surface end to dispose the opening of the first liquid passage and the opening of the second liquid passage,
    wherein the groove houses the first and second liquid passages together therein and has an opening at a distal end thereof, and the depression is formed in the lens at a position opposed to the opening of the groove such that the opening of the first liquid passage and the opening of the second liquid passage face a side surface of the lens.

2. The objective lens unit according to claim 1, wherein
    the first liquid passage is a flow passage to supply an immersion liquid to the lens surface end, and
    the second liquid passage is a flow passage to suction and discharge the immersion liquid that flows out of the opening of the first liquid passage.

3. The objective lens unit according to claim 1, wherein
    the lens at the closest side to the observing object is a cemented lens including a meniscus lens having a depression in a center of a surface on an observing object side and a small-sized plano-convex lens fitted in the depression in the center of the meniscus lens, and
    the opening of the first liquid passage and the opening of the second liquid passage are disposed at a position avoiding overlapping the plano-convex lens.

4. The objective lens unit according to claim 1, wherein
    the first liquid passage and the second liquid passage are disposed so as to avoid projecting to the observing object side with respect to the lens surface end.

5. The objective lens unit according to claim 1, further comprising
    a cover that houses the lens at the closest side to the observing object, wherein
    the cover includes a groove to house the first liquid passage and the second liquid passage.

6. A liquid immersion microscope comprising:
    the objective lens unit according to claim 1;
    a supply mechanism that supplies an immersion liquid to the lens surface end via the first liquid passage;
    a discharge mechanism that discharges the immersion liquid via the second liquid passage; and
    a controller that controls operations of the supply mechanism and the discharge mechanism, wherein
    the controller causes a supplying operation of the immersion liquid and a discharging operation of the immersion liquid to be simultaneously performed at a start of supplying the immersion liquid and causes the discharging operation of the immersion liquid to be precedingly terminated.

7. The liquid immersion microscope according to claim 6, wherein
    the liquid immersion microscope is an inverted liquid immersion microscope.

8. The objective lens unit according to claim 1, wherein the first liquid passage is disposed on a same side of the lens as the second liquid passage.

9. The objective lens unit according to claim 1, wherein the depression is configured so as to avoid overlapping an optical range of the lens surface so that both a supply port and a suction port are disposed at a position that avoids overlapping the optical range.

* * * * *